(12) United States Patent
Gan et al.

(10) Patent No.: US 12,155,755 B2
(45) Date of Patent: Nov. 26, 2024

(54) KEY NEGOTIATION METHOD AND INTERNET OF THINGS (IoT) DEVICE

(71) Applicant: Huawei Technologies Co., Ltd., Shenzhen (CN)

(72) Inventors: Lu Gan, Xi'an (CN); Jianhao Huang, Dongguan (CN); Xiaoshuang Ma, Beijing (CN); Chong Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 17/780,902

(22) PCT Filed: Nov. 26, 2020

(86) PCT No.: PCT/CN2020/131968
§ 371 (c)(1),
(2) Date: May 27, 2022

(87) PCT Pub. No.: WO2021/104408
PCT Pub. Date: Jun. 3, 2021

(65) Prior Publication Data
US 2023/0017263 A1    Jan. 19, 2023

(30) Foreign Application Priority Data
Nov. 29, 2019   (CN) .................. 201911207543.X

(51) Int. Cl.
*H04L 9/08*   (2006.01)
*G16Y 30/10*  (2020.01)
*H04L 9/06*   (2006.01)

(52) U.S. Cl.
CPC ............ *H04L 9/0838* (2013.01); *G16Y 30/10* (2020.01); *H04L 9/0618* (2013.01); *H04L 9/0819* (2013.01); *H04L 9/0869* (2013.01)

(58) Field of Classification Search
CPC ... H04L 9/0838; H04L 9/0618; H04L 9/0819; H04L 9/0869; H04L 67/51;
(Continued)

(56) References Cited

U.S. PATENT DOCUMENTS 9,843,929 B2   12/2017   Zimmerman et al.
10,454,674 B1  10/2019   Bar-El et al.
(Continued)

FOREIGN PATENT DOCUMENTS

CN   101026479 A   8/2007
CN   102387501 A   3/2012
(Continued)

OTHER PUBLICATIONS

Hans Delfs, "Information Security and Cryptography" Introduction to Cryptography Principles and Applications, 3rd edition, 2015, 16 pages.
(Continued)

*Primary Examiner* — Bryan F Wright
(74) *Attorney, Agent, or Firm* — Conley Rose, P.C.

(57) ABSTRACT

A key negotiation method and an electronic device are provided, and relate to the field of communications technologies. Specifically, the method includes: An IoT control device multicasts, in a first local area network, a discovery message that carries a first public key, and sends a second ciphertext to a first IoT device after receiving a first ciphertext and a second public key. After receiving a third ciphertext from the first IoT device, the IoT control device decrypts the third ciphertext based on a first session key, to obtain a second signature and second session information; verifies the second signature based on a long-term public key of the first IoT device; and performs encrypted communication with the first IoT device based on the first session key after the second signature is successfully verified.

20 Claims, 14 Drawing Sheets

(58) Field of Classification Search
CPC . H04L 2209/805; H04L 9/3247; G16Y 30/10; H04W 4/70; H04W 12/009; H04W 12/047; H04W 12/108; H04W 12/04; H04W 12/03
USPC .......................................................... 713/171
See application file for complete search history.

(56) References Cited

U.S. PATENT DOCUMENTS

| | | | |
|---|---|---|---|
| 2012/0054493 A1 | 3/2012 | Bradley | |
| 2016/0286395 A1 | 9/2016 | Adrangi et al. | |
| 2018/0295114 A1 | 10/2018 | Abdalla et al. | |
| 2019/0034919 A1 | 1/2019 | Nolan et al. | |
| 2019/0250899 A1* | 8/2019 | Riedl | H04L 9/0825 |
| 2020/0396060 A1 | 12/2020 | Wu et al. | |
| 2023/0017263 A1 | 1/2023 | Gan et al. | |

FOREIGN PATENT DOCUMENTS

| | | |
|---|---|---|
| CN | 104618362 A | 5/2015 |
| CN | 107786974 A | 3/2018 |
| CN | 109547205 A | 3/2019 |
| CN | 110311883 A | 10/2019 |
| CN | 110933672 A | 3/2020 |
| CN | 111342955 A | 6/2020 |
| KR | 20180130203 A | 12/2018 |
| WO | 2016153689 A1 | 9/2016 |

OTHER PUBLICATIONS

Ioannis Askoxylakis, "Computer Security—ESORICS 2016," 21st European Symposium on Research in Computer Security, Heraklion, Greece, Sep. 26-30, 2016, Proceedings, Part II, 8 pages.
Liu jianhua, "IoT security," Sep. 1, 2013, 6 pages (abstract).

* cited by examiner

KEY NEGOTIATION METHOD AND INTERNET OF THINGS (IoT) DEVICE

CROSS-REFERENCE TO RELATED APPLICATION

This is a U.S. National Stage of International Patent Application No. PCT/CN2020/131968 filed on Nov. 26, 2020, which claims priority to Chinese Patent Application 201911207543.X filed on Nov. 29, 2019. Both of the aforementioned applications are hereby incorporated by reference in their entireties.

TECHNICAL FIELD

This application relates to the field of communications technologies, and in particular, to a key negotiation method and an electronic device.

BACKGROUND

After an Internet of Things (internet of things, IoT) device accesses a network, a user can control the IoT device by using an IoT application program (IoT application for short below) installed on a mobile phone. In an example, the IoT device is a smart desk lamp. The user performs a corresponding operation on an IoT application installed on the mobile phone, so that the mobile phone may send a control instruction to the smart desk lamp in response to the operation of the user, to control the smart desk lamp, for example, control the smart desk lamp to be turned on or off.

To ensure security of communication between the mobile phone and the IoT device, a session key is usually used to perform encrypted communication between the mobile phone and the IoT device. However, in the prior art, the session key is obtained by the mobile phone through end-to-end (station to station, STS) negotiation with the IoT device after discovering the IoT device. This manner of obtaining the session key has relatively low efficiency.

SUMMARY

This application provides a key negotiation method and an electronic device, to reduce a quantity of message exchanges between an IoT device and an IoT control device, to improve efficiency of obtaining a session key.

According to a first aspect, an embodiment of this application provides a key negotiation method, specifically including:

An IoT control device multicasts a discovery message in a first local area network. The discovery message includes a first public key. The first local area network is a network that has been accessed by the IoT control device. The first public key is obtained based on a first random number.

A first IoT device receives the discovery message from the IoT control device, and sends a discovery response to the IoT control device. The discovery response includes a first ciphertext and a second public key. The first ciphertext is obtained by encrypting device information of the first IoT device based on a first session key. The second public key is obtained based on a second random number. The first session key is obtained by the first IoT device based on the second random number and the first public key.

After receiving the discovery response from the first IoT device, the IoT control device sends a second ciphertext to the first IoT device. The second ciphertext is obtained by encrypting a first signature based on the first session key. The first signature is a signature on first session information based on a long-term private key of the IoT control device. The first session information includes the first public key and the second public key. The first session key is obtained by the IoT control device based on the first random number and the second public key.

After receiving the second ciphertext sent by the IoT control device, the first IoT device decrypts the second ciphertext based on the first session key, to obtain the first signature. In addition, the first IoT device sends a third ciphertext to the IoT control device after successfully verifying the first signature based on a long-term public key of the IoT control device. The third ciphertext is obtained by encrypting a second signature and second session information based on the first session key. The second signature is a signature on third session information based on a long-term private key of the IoT device. The third session information includes the second public key and the first public key. The second session information includes a session identifier ID.

After receiving the third ciphertext from the first IoT device, the IoT control device decrypts the third ciphertext based on the first session key, to obtain the second signature and the second session information; and verifies the second signature based on a long-term public key of the first IoT device. After the second signature is successfully verified, the IoT control device stores the first session key and the second session information.

Finally, the IoT control device performs encrypted communication with the first IoT device based on the first session key.

In this embodiment of this application, because the IoT control device adds the first public key to the discovery message and multicasts the discovery message to the IoT device, an STS negotiation process is integrated into a discovery process. This helps reduce a quantity of message exchanges between the IoT device and the IoT control device, and improve efficiency of obtaining a session key. In addition, in the discovery process, the IoT device may further encrypt the device information by using the session key, and then send the encrypted device information to the IoT control device, thereby reducing an attack risk caused by exposing the device information of the IoT device in a network.

In a possible design, the second session information further includes a validity period of the first session key. The foregoing technical solution helps reduce a risk of leakage of the first session key, and improve security of communication between the IoT control device and the IoT device.

In a possible design, after receiving the discovery message from the IoT control device, the first IoT device sends the discovery response to the IoT control device if the first IoT device determines that a stored second session key between the first IoT device and the IoT control device is not within a validity period or that no session information between the first IoT device and the IoT device is stored.

In a possible design, after receiving the discovery message, the first IoT device sends a fourth ciphertext to the IoT control device if the first IoT device determines that a stored second session key between the first IoT device and the IoT control device is within a validity period or that stored session information between the first IoT device and the IoT device is not lost. The fourth ciphertext is obtained by encrypting first information based on the first session key. The first information includes device information of the IoT device. After receiving the fourth ciphertext sent by the first IoT device, the IoT control device performs encrypted communication with the first IoT device based on the second session key if the IoT control device determines that the stored second session key between the IoT control device and the first IoT device is within the validity period or that the stored session information between the IoT control device and the first IoT device is not lost. When the second session key stored in the first IoT device and the IoT control device is within the validity period, or the stored session information between the first IoT device and the IoT control device is not lost, the IoT control device and the first IoT device perform encrypted communication based on the second session key, thereby further helping reduce a quantity of message exchanges, and improve efficiency of session key negotiation.

In a possible design, the first information further includes fourth session information, and the fourth session information includes a stored ID of a session with the first IoT device, so that the IoT control device searches for session information between the IoT control device and the first IoT device.

In a possible design, the IoT control device may multicast the discovery message in the following manner:
  periodically multicasting the discovery message in the first local area network; and/or
  multicasting the discovery message in the first local area network when switching from a second local area network to the first local area network; and/or
  multicasting the discovery message in the first local area network when being bound to a new IoT device; and/or
  multicasting the discovery message in the first local area network when a session key of a second IoT device reaches an expiration date of a validity period.

In a possible design, the first IoT device may receive, in the following manner, the discovery message multicast by the IoT control device in the first local area network:
  periodically receiving the discovery message multicast by the IoT control device in the first local area network; and/or
  receiving, during network switching, the discovery message multicast by the IoT control device in the first local area network; and/or
  receiving, after being bound to the IoT control device, the discovery message multicast by the IoT control device in the first local area network; and/or
  receiving, when the stored second session key between the first IoT device and the IoT control device reaches an expiration date of the validity period, the discovery message multicast by the IoT control device in the first local area network.

In a possible design, the first IoT device is in the second local area network.

According to a second aspect, an embodiment of this application provides a communications system, including an IoT control device and a first IoT device.

The IoT control device is configured to multicast a discovery message in a first local area network. The discovery message includes a first public key. The first local area network is a network that has been accessed by the IoT control device. The first public key is obtained based on a first random number.

The IoT control device is further configured to: receive a discovery response from the first IoT device, and send a second ciphertext to the first IoT device. The discovery response includes a first ciphertext and a second public key. The first ciphertext is obtained by encrypting device information of the first IoT device based on a first session key. The second public key is obtained based on a second random number. The second ciphertext is obtained by encrypting a first signature based on the first session key. The first signature is a signature on first session information based on a long-term private key of the IoT control device. The first session information includes the first public key and the second public key. The first session key is obtained by the IoT control device based on the first random number and the second public key.

The IoT control device is further configured to: receive a third ciphertext from the first IoT device, and decrypt the third ciphertext based on the first session key, to obtain a second signature and second session information: then, verify the second signature based on a long-term public key of the first IoT device; store the first session key and the second session information after the second signature is successfully verified; and finally, perform encrypted communication with the first IoT device based on the first session key.

The first IoT device is configured to: receive the discovery message from the IoT control device, and send the discovery response to the IoT control device; receive the second ciphertext sent by the IoT control device, and then decrypt the second ciphertext based on the first session key to obtain the first signature; and send the third ciphertext to the IoT control device after the first IoT device successfully verifies the first signature based on a long-term public key of the IoT control device. The third ciphertext is obtained by encrypting the second signature and the second session information based on the first session key. The second signature is a signature on third session information based on a long-term private key of the IoT device. The third session information includes the second public key and the first public key. The second session information includes a session identifier ID.

According to a third aspect, an embodiment of this application provides an electronic device, including a processor, a memory, and a transceiver. The processor is coupled to the memory and the transceiver. The memory stores program instructions. The processor is configured to read and execute the program instructions stored in the memory. When the program instructions are executed by the processor, the electronic device is enabled to implement the steps performed by the IoT control device or the IoT device in the method according to any one of the first aspect and the possible designs of the first aspect of the embodiments of this application.

According to a fourth aspect, an embodiment of this application provides an electronic device, including an apparatus for performing steps performed by the IoT control device or the IoT device in the method according to any one of the first aspect and the possible designs of the first aspect.

According to a fifth aspect, an embodiment of this application provides a computer readable storage medium. The computer readable storage medium stores program instructions. When the program instructions are run on an electronic device, the electronic device is enabled to perform the steps performed by the IoT control device or the IoT device in the method according to any one of the first aspect and the possible designs of the first aspect of the embodiments of this application.

According to a sixth aspect, an embodiment of this application provides a computer program product. When the computer program product runs on an electronic device, the electronic device is enabled to perform the steps performed by the IoT control device or the IoT device in the method according to any one of the first aspect and the possible designs of the first aspect of the embodiments of this application.

According to a seventh aspect, an embodiment of this application provides a chip. The chip is coupled to a memory in an electronic device, and controls the electronic device to perform steps performed by the IoT control device or the IoT device in the method according to any one of the first aspect and the possible designs of the first aspect of the embodiments of this application.

In addition, for technical effects brought by the second aspect to the seventh aspect, refer to related descriptions of the design methods in the foregoing method part. Details are not described herein again.

It should be noted that "coupling" in the embodiments of this application means that two components are directly or indirectly connected to each other.

DESCRIPTION OF EMBODIMENTS

Figure 1:
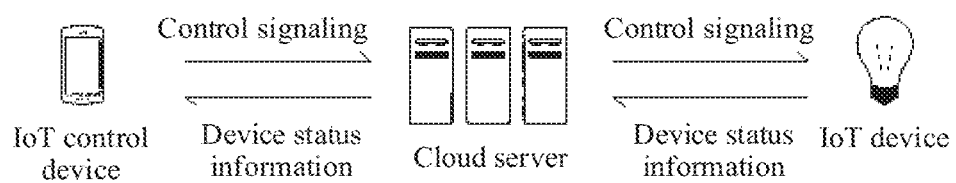
FIG. 1 is a scenario in which an IoT control device controls an IoT device according to an embodiment of this application.

It should be understood that, unless otherwise specified in this application, "/" means or. For example, A/B may represent A or B. The term "and/or" in this application describes only an association relationship for describing associated objects and represents that three relationships may exist. For example, A and/or B may represent the following cases: Only A exists, both A and B exist, and only B exists. "At least one" means one or more. "A plurality of" means two or more than two. For example, at least one of a, b, or c may represent seven cases: a, b, c, a and b, a and c, b and c, and a, b and c.

In this application, "example", "in some embodiments", "in some other embodiments", and the like are used to represent examples, illustrations, or descriptions. Any embodiment or design scheme described as an "example" in this application should not be explained as being more preferred or having more advantages than another embodiment or design scheme. Exactly, "for example" is used to present a concept in a specific manner.

In addition, the terms "first" and "second" in this application are merely intended for a purpose of description, and shall not be understood as an indication or implication of relative importance or implicit indication of the number of indicated technical features.

A user may control an IoT device by using an electronic device on which an IoT application is installed. The electronic device on which the IoT application is installed is referred to as an IoT control device below. For example, the IoT control device may be a portable electronic device such as a mobile phone, a tablet computer, a notebook computer, an ultra-mobile personal computer (ultra-mobile personal computer, UMPC), a netbook, or a personal digital assistant (personal digital assistant, PDA). For another example, the IoT control device may alternatively be a desktop computer, a smart screen, or the like. A specific type of the IoT control device is not limited in the embodiments of this application. It should be noted that, unlike a traditional television, the smart screen is a new large-screen product. In addition to implementing audio and video playing, the smart screen plays more roles in a home. For example, the smart screen may be an interaction center, an information sharing center, and a control management center of an intelligent device such as a smart home device or a mobile phone.

In this application, the IoT device may be a smart home device, for example, a smart speaker, a smart desk lamp, a smart air conditioner, a smart refrigerator, or a smart curtain. In addition, the IoT device may alternatively be a smart device such as an in-vehicle device, a wearable device, or an augmented reality (augmented reality, AR)/virtual reality (virtual reality, VR) device. A specific type of the IoT device is not limited in the embodiments of this application.

Specifically, the IoT control device controls the IoT device by sending a control instruction to the IoT device. Usually, the IoT device sends a control instruction to the IoT device in response to an operation performed by a user on the IoT application. It should be noted that control instructions for different types of IoT devices may be the same or may be different. For example, for the smart speaker, the control instruction may include a play instruction, a play pause instruction, a volume adjustment instruction, a play progress adjustment instruction, a play content switching instruction, or the like. For another example, for the smart desk lamp, the control instruction may include a light-on instruction, a light-off instruction, a brightness adjustment instruction, or the like.

In addition, the IoT device may further report device status information to the IoT control device, so that the IoT control device can present a current status of the IoT device to the user. The device status information is used to indicate the current status of the IoT device. For example, the current status of the IoT device may include a current running status of the IoT device, a current usage status of the IoT device, and the like.

The smart speaker is used as an example. The IoT control device sends a play instruction to the smart speaker. After receiving the play instruction sent by the IoT control device in a play paused state, the smart speaker plays corresponding content in response to the play instruction, so that a current status of the smart speaker changes to a play state. When the current status of the smart speaker changes from the play paused state to the play state, the smart speaker can report device status information to the IoT control device. The device status information is used to indicate that the current status of the smart sound box is the play state. After receiving the device status information reported by the smart speaker, the IoT control device may update, based on the device status information, the current status of the smart speaker presented to the user.

In a scenario in which the IoT control device and the IoT device are separately connected to a cloud server, as shown in FIG. 1, the IoT control device sends a control instruction to the IoT device by using the cloud server, and the IoT device sends device status information to the IoT control device by using the cloud server. In this scenario, regardless of whether the IoT device and the IoT control device are in a same local area network, a user can control the IoT device by using the IoT control device. However, because both control signaling and device status information need to be forwarded by using the cloud server, execution of a control command and reception of the device status information are easily caused to have a relatively high delay and a relatively low success rate.

Figure 2:
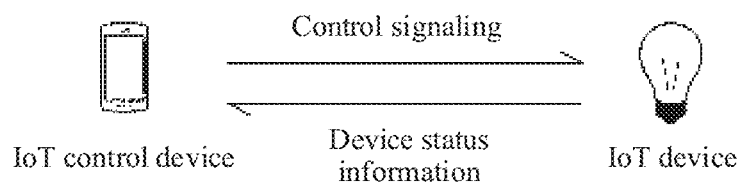
FIG. 2 is another scenario in which an IoT control device controls an IoT device according to an embodiment of this application.

To this end, a local control IoT solution is proposed. In the local control IoT solution, the IoT control device and the IoT device are usually in a same local area network. As shown in FIG. 2, control signaling and device status information exchanges between the IoT control device and the IoT device may not need to be forwarded by the cloud server, thereby helping reduce a delay in executing a control command and receiving the device status information. For example, the local area network in this application may be a Wi-Fi network or a wired network.

Specifically, that the IoT control device and the IoT device are in a same local area network may be understood as: The IoT control device and the IoT device are connected to a same router. In addition, it should be noted that, in the local control IoT solution, the IoT control device and the IoT device may alternatively be in different local area networks. For example, the IoT control device is in a first local area network and is connected to a first router, and the IoT device is in a second local area network and is connected to a second router. The first router and the second router are interconnected. It should be understood that, that the first router and the second router are interconnected may be understood as follows: The first router and the second router may exchange messages to each other, and the information exchange between the first router and the second router includes a multicast message exchange.

Figure 3:
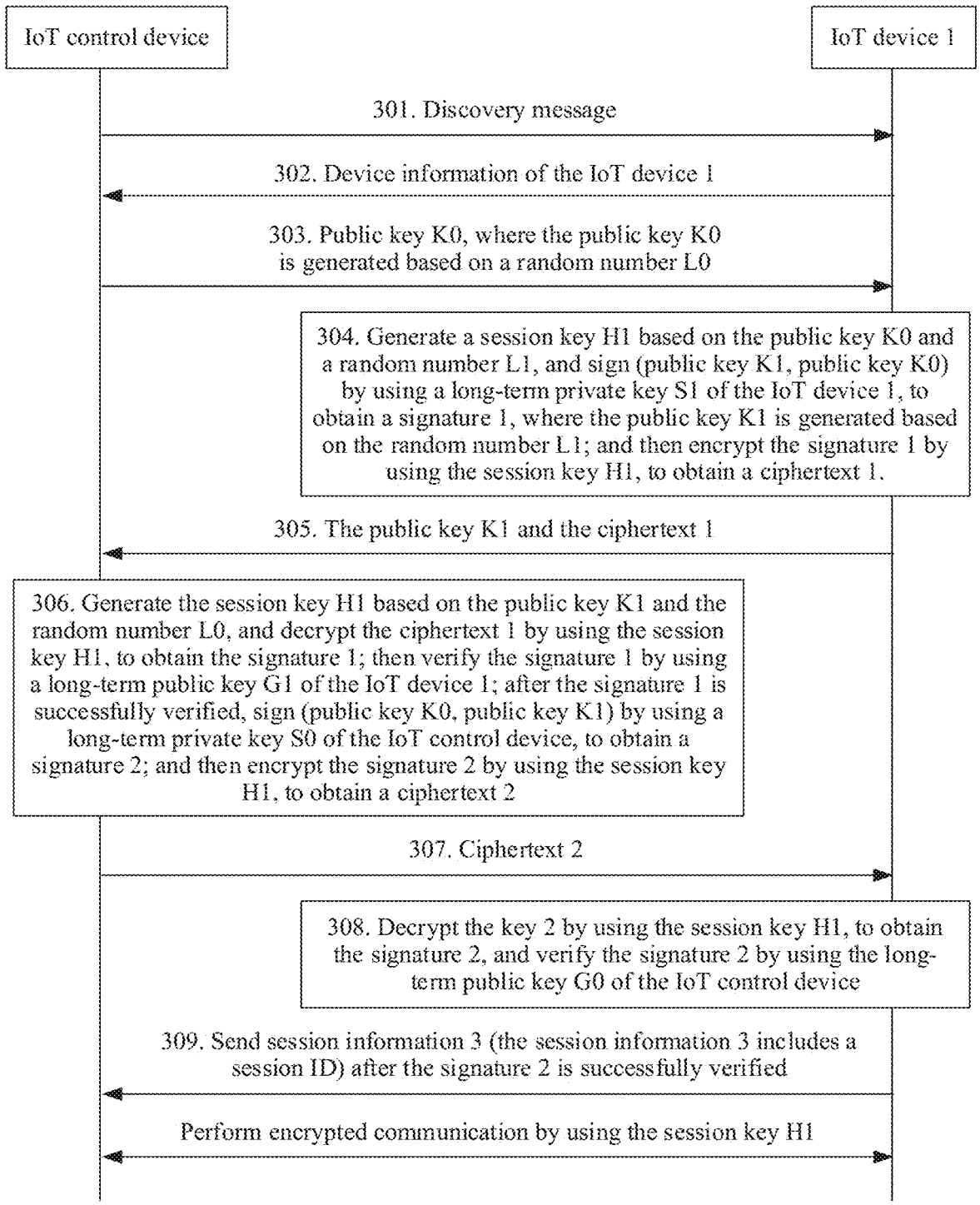
FIG. 3 is a schematic flowchart of a key negotiation method according to an embodiment of this application.

In an example, the IoT control device is in the first local area network. In the local control IoT solution, the IoT control device initiates an IoT device discovery procedure to discover the IoT device, thereby implementing communication with the IoT device. In addition, to ensure security of communication between the IoT control device and the IoT device, a session key is usually used to perform encrypted communication between the IoT control device and the IoT device. For example, the session key may be obtained by the IoT control device through negotiation based on an end-to-end (Station to Station. STS) protocol after discovering the IoT device. A specific procedure is shown in FIG. 3, including the following steps.

Step 301: The IoT control device multicasts a discovery message in the first local area network. The first local area network is a network that has been currently accessed by the IoT control device. For example, the IoT control device may multicast the discovery message in the first local area network based on a user datagram protocol (user datagram protocol, UDP) or a multicast domain name system (multicast domain name system, mDNS) protocol.

It may be understood that the discovery message may also be referred to as a detection message, a device discovery message, a device detection message, or the like. For example, the discovery message may include related information of the IoT control device, for example, a device identifier (identity, ID), an IP address, and a user ID of the IoT control device.

Step 302: An IoT device 1 returns device information of the IoT device 1 to the IoT control device after receiving the discovery message.

For example, the IoT device 1 may add the device information of the IoT device 1 to a discovery response and return the discovery response to the IoT control device. The discovery response may also be referred to as a detection response, a device discovery response, a device detection response, or the like.

Specifically, the device information of the IoT device 1 in this embodiment of this application may include one or more of a device ID, a device type, an internet protocol (internet protocol, IP) address, a port number, and the like. For example, the device information of the IoT device 1 includes a device ID. For another example, the device information of the IoT device 1 includes an IP address. For another example, the device information of the IoT device 1 includes a device ID, a device type, and an IP address. For still another example, the device information of the IoT device 1 includes a device ID, a device type, an IP address, and a port number.

It should be noted that the device type may include a television, a speaker, an air conditioner, an electric lamp, a refrigerator, or the like. For example, the IoT device 1 is a smart desk lamp, and a type of the IoT device 1 is an electric lamp. For another example, the IoT device 1 is a smart refrigerator, and a type of the IoT device 1 is a refrigerator.

Step 303: The IoT control device sends a public key K0 to the IoT device 1 after receiving the device information of the IoT device 1. The public key K0 is generated based on a random number L0.

It should be noted that in this embodiment of this application, the random number L0 may also be referred to as a private key, and form a key pair together with the public key K0. For example, m this embodiment of this application, the IoT control device may use the random number L0 as an input of a function f( ), and use an output of the function f( ) as the public key K0. The function f( ) may be an exponential function, a power function, a quadratic function, a cubic function, or the like. This is not limited. For example, the function f( ) is $y=g^x$, and when the random number L0 is x0, the public key K0 is y0, where $y0=g^{x0}$. The function f( ) may be defined by using a protocol, or may be determined by the IoT control device based on a policy or an algorithm. This is not limited.

Step 304: The IoT device 1 generates a session key H1 based on the public key K0 and a random number L1 after receiving the public key K0. In addition, the IoT device 1 signs session information 1 by using a long-term private key S1 of the IoT device 1, to obtain a signature 1. The session information 1 includes a public key K1 and the public key K0, and the public key K1 is generated based on the random number L1. Then, the IoT device 1 encrypts the signature 1 by using the session key H1 to obtain a ciphertext (ciphertext) 1.

For example, the session information 1 includes (public key K1, public key K0).

It should be noted that the random number L1 and the public key K1 form a key pair. For a manner in which the IoT device 1 generates the public key K1 based on the random number L1, refer to a manner in which the public key K0 is generated based on the random number L0. Details are not described herein again.

A validity period of the long-term private key S1 of the IoT device 1 is greater than or equal to a threshold. For example, the long-term private key S1 of the IoT device 1 may be valid for a long time, and may be configured before the device is delivered. It should be noted that, a validity period of the long-term public key G1 corresponding to the long-term private key S1 in the IoT device 1 is the same as that of the long-term private key S1, and may also be configured before the device is delivered.

Step 305: The IoT device 1 sends the public key K1 and the ciphertext 1 to the IoT control device.

Step 306: The IoT control device generates the session key H1 based on the public key K1 and the random number L0 after receiving the public key K1 and the ciphertext 1. Then, the IoT control device decrypts the ciphertext 1 by using the session key H1, to obtain the signature 1. The IoT control device verifies the signature 1 by using the long-term public key G1 of the IoT device 1. In addition, after the signature 1 is successfully verified, the IoT control device signs session information 2 by using a long-term private key S0 of the IoT control device, to obtain a signature 2, and encrypts the signature 2 by using the session key H1, to obtain a ciphertext 2. The session information 2 includes the public key K0 and the public key K1. For example, the session information 2 includes (public key K0, public key K1).

Specifically, a validity period of the long-term private key S0 of the IoT control device is greater than or equal to a threshold. For example, the long-term private key S0 of the IoT control device may be valid for a long time, and may be configured before the device is delivered. It should be noted that, a validity period of a long-term public key G0 corresponding to the long-term private key S0 in the IoT control device is the same as that of the long-term private key S0, and may also be configured before the device is delivered.

Step 307: The IoT control device sends the ciphertext 2 to the IoT device 1.

Step 308: After receiving the ciphertext 2, the IoT device 1 decrypts the ciphertext 2 by using the session key H1, to obtain the signature 2. Then, the IoT device 1 verifies the signature 2 by using the long-term public key G0 of the IoT control device.

Step 309: The IoT device 1 sends session information 3 to the IoT control device after the signature 2 is successfully verified. For example, the IoT device 1 may first encrypt the session information 3 by using the session key H1, and then send the encrypted session information 3 to the IoT control device, thereby improving security of sending the session information 3.

For example, the session information 3 may include a session ID and the like. After the IoT control device receives the session information 3 sent by the IoT device 1, the IoT control device and the IoT device 1 may perform encrypted communication by using the session key H1.

For example, the IoT control device encrypts a control instruction by using the session key H1, and sends the encrypted control instruction to the IoT device 1.

It should be noted that, for the IoT device 1, step 301 and step 302 are an IoT device discovery process. Step 303 to step 309 are an STS negotiation process. Another IoT device (for example, an IoT device 2 or an IoT device n) also returns device information of the another IoT device to the IoT control device if receiving the discovery message multicast by the IoT control device in the first local area network. In this case, an STS negotiation process may also be performed between the IoT control device and the another IoT device, to obtain a session key used for communication between the IoT control device and another IoT device. For the STS negotiation process between the IoT control device and the another IoT device, refer to the STS negotiation process between the IoT control device and the IoT device 1. Details are not described herein again.

In the method shown in FIG. 3, after discovering the IoT device, the IoT control device performs the STS negotiation process to obtain the session key, to implement encrypted communication between the IoT control device and the IoT device. Therefore, in this manner of obtaining a session key, efficiency is relatively low. In addition, in the IoT device discovery process, after receiving the discovery message sent by the IoT control device, the IoT device returns the device information to the IoT control device in plaintext. As a result, the device information of the IoT device is easily exposed in a network, and an attacker may attack the IoT device.

In view of this, an embodiment of this application provides a key negotiation method. An STS negotiation process is integrated into a discovery process, thereby helping reduce a quantity of message exchanges between an IoT device and an IoT control device, and improve efficiency of obtaining a session key. In addition, in the discovery process, the IoT device may further encrypt device information by using the session key, and then sends the encrypted device information to the IoT control device, thereby reducing an attack risk caused by exposing the device information of the IoT device in a network.

Figure 4:
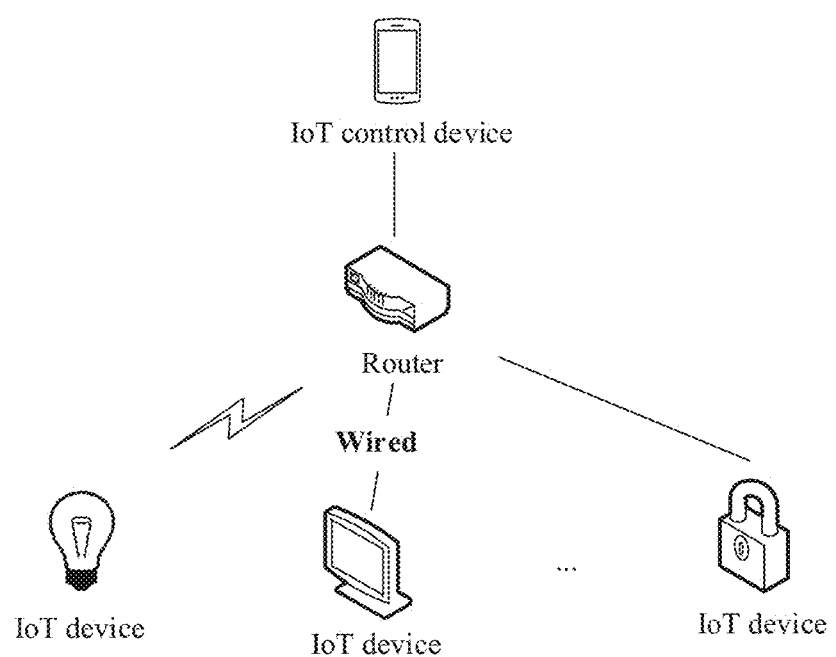
FIG. 4 is a schematic diagram of a network architecture according to an embodiment of this application.

For example, FIG. 4 is a schematic diagram of a network architecture to which an embodiment of this application is applicable. The network architecture includes an IoT control device, a router, and an IoT device. It should be noted that, in this embodiment of this application, a connection manner between the IoT device and the router may be a wireless connection, or may be a wired connection. A connection manner between the IoT control device and the router may be a wireless connection or a wired connection.

It should be understood that FIG. 4 is merely an example of a network architecture to which this embodiment of this application is applicable, and does not constitute a limitation on the network architecture to which this embodiment of this application is applicable.

Figure 5:
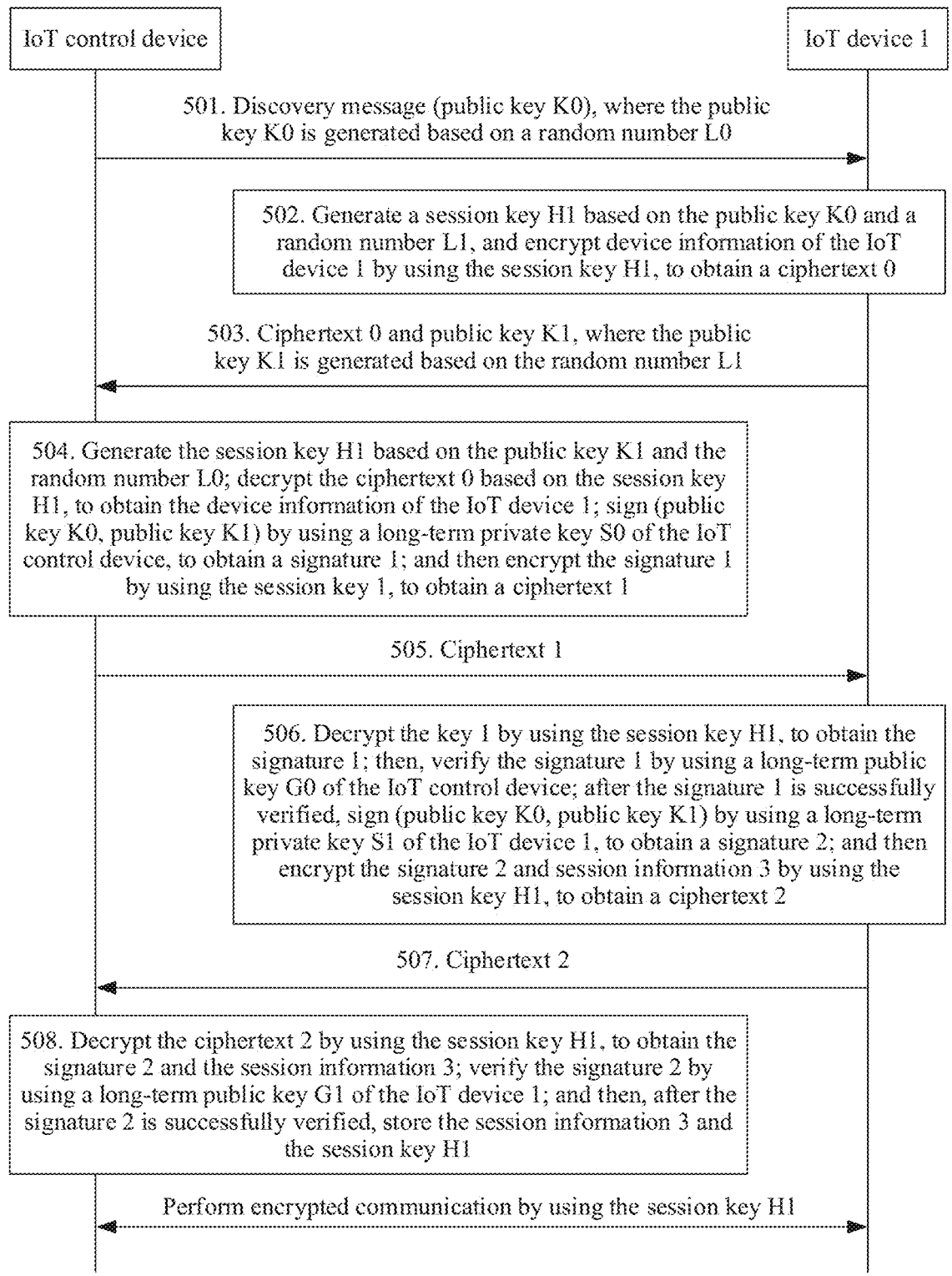
FIG. 5 is a schematic flowchart of another key negotiation method according to an embodiment of this application.

Specifically, FIG. 5 is a schematic flowchart of a key negotiation method according to an embodiment of this application. The method specifically includes the following steps.

Step 501: An IoT control device multicasts a discovery message in a first local area network. The first local area network is a network that has been accessed by the IoT control device. The discovery message includes a public key K0. The public key K0 is generated based on a random number L0.

For a specific implementation in which the IoT control device generates the public key K0 based on the random number L0, refer to related descriptions of the implementation in which the public key K0 is generated based on the random number L0 in step 303. Details are not described herein again. In addition, the discovery message may further include related information of the IoT control device, for example, a device ID, an IP address, and a user ID of the IoT control device.

It should be noted that, for a specific implementation in which the IoT control device multicasts the discovery message in the first local area network, reference may be made to a related implementation in step 301. Details are not described herein again.

Specifically, the IoT control device may multicast discovery message in the first local area network periodically and/or through triggering by an event. For example, after being powered on, the IoT control device may detect access to a local area network (for example, the first local area network), and trigger periodic multicasting of the discovery message in the first local area network. In addition, for another example, an event that triggers multicasting of a discovery message in the first local area network or triggers periodic multicasting of a discovery message in the first local area network may include: a network accessed by the IoT control device is switched from a second local area network to the first local area network; the IoT control device is bound to a new IoT device; a session key negotiation indication (for example, a session key negotiation indication sent to the IoT control device by an IoT device after being powered off and restarted, where for example, the indication may be a specific symbol or sequence) sent by the IoT device in the first local area network is received; a quantity of sessions of an IoT device bound to the IoT control device is greater than or equal to a maximum value limited by a system, or a session key of an IoT device bound to the IoT control device has reached or is about to reach an expiration date of a validity period. For example, if the validity period of the session key is 30 minutes, and the IoT control device stores the session key at a moment of 5:00, the expiration date of the validity period of the session key is 5:30. It should be noted that, that a session key of an IoT device bound to the IoT control device is about to reach an expiration date of a validity period may be understood as follows: The session key of the IoT device bound to the IoT control device reaches the expiration date of the validity period after first duration. The first duration may be predefined, or may be determined by the IoT device based on an algorithm or a policy. For example, the first duration may be two minutes, 15 seconds, or the like. This is not limited. For example, if the validity period of the session key is 10 minutes, and the IoT control device stores the session key at a moment of 4:00, the expiration date of the validity period of the session key is 4:10. For example, the first duration is one minute. When 4:09 is reached, the IoT control device triggers multicasting of the discovery message in the first local area network.

It should be noted that the foregoing is merely an example for description of an event that triggers the IoT control device to multicast a discovery message in the first local area network. This is not limited in this embodiment of this application.

In addition, when the IoT device periodically multicasts the discovery message, public keys K0 carried in discovery messages multicast in adjacent periods may be different, or public keys K0 carried in discovery messages multicast in different periods may be different, thereby helping improve security of key negotiation. In order that discovery messages in adjacent or different periods carry different public keys K0, the IoT control device may generate the public key K0 by using different random numbers L0 and/or different algorithms in adjacent or different periods.

In some embodiments, the IoT control device sends the discovery message to a first router, and the first router multicasts the discovery message to one or more IoT devices in the first local area network. The first router is a router used by the IoT control device to access the first local area network.

Step 502: An IoT device 1 generates a session key H1 based on the public key K0 and a random number L1 after receiving the discovery message. Then, the IoT device 1 encrypts device information of the IoT device 1 by using the session key H1, to obtain a ciphertext 0. For the device information of the IoT device 1, refer to related descriptions of the device information of the IoT device 1 in FIG. 3. Details are not described herein again.

It should be noted that the IoT device 1 may be in the first local area network, or may not be in the first local area network. That is, the network accessed by the IoT device 1 may be the first local area network, or may not be the first local area network. This is not limited.

Further, after receiving the discovery message, the IoT device 1 determines whether the IoT device 1 has been bound to the IoT control device. If the IoT device 1 has been bound to the IoT control device, the IoT device 1 generates the session key H1 based on the public key K0 and the random number L1, and then performs a subsequent step. For example, the IoT device 1 may determine whether a user ID stored in the IoT device 1 is the same as or associated with a user ID carried in the discovery message, to determine whether the IoT device 1 has been bound to the IoT control device. For example, if the user ID stored in the IoT device 1 is the same as or associated with the user ID carried in the discovery message, the IoT device 1 determines that the IoT device 1 has been bound to the IoT control device. For another example, the IoT device 1 may further determine whether the IoT device 1 stores a long-term public key corresponding to the device ID carried in the discovery message, to determine whether the IoT device 1 has been bound to the IoT control device.

For example, if an IoT device that is not bound to the IoT control device receives a discovery message from the IoT control device, after the IoT device determines that the IoT device is not bound to the IoT control device, the IoT device considers the discovery message as an invalid message, and discards or ignores the discovery message. It may be understood that, after purchasing the IoT device, a user usually initiates a procedure of binding the IoT device by performing an operation on the IoT control device, to bind the IoT device to the IoT control device, to facilitate control of the IoT device by the user. Specifically, for a procedure of binding the IoT device 1 and the IoT control device, refer to related descriptions in FIG. 6. Details are not described herein again.

An algorithm used by the IoT device 1 to generate the session key H1 based on the public key K0 and the random number L1 may be a Diffie-Hellman algorithm or another algorithm used to generate a symmetric key. This is not limited. Specifically, an algorithm used by the IoT device 1 to generate the session key H1 may be defined by using a protocol, or may be determined by the IoT control device and the IoT device 1 through negotiation. This is not limited.

In some embodiments, the IoT device 1 may receive the discovery message periodically and/or through triggering by an event. For example, an event that triggers the IoT device 1 to receive the discovery message may be: the IoT device 1 is powered on: the IoT device 1 switches a network that is accessed by the IoT device 1; the IoT device 1 completes binding with the IoT control device; the session key between the IoT device 1 and the IoT control device reaches or is about to reach an expiration date of a validity period; or a quantity of sessions between the IoT device 1 and the IoT control device exceeds a maximum value limited by a system.

Step 503: The IoT device 1 sends the ciphertext 0 and a public key K1 to the IoT control device. The public key K1 is generated by the IoT device 1 based on the random number L1. For example, the IoT device may add the ciphertext 0 and the public key K1 to a discovery response and return the discovery response to the IoT control device.

For example, for a function used by the IoT device 1 to generate the public key K1 based on the random number L1, refer to the related description of the function f( ) in step 303. Details are not described herein again.

In some embodiments, the IoT device 1 sends the ciphertext 0 and the public key K1 to a second router, and the second router sends the key 0 and the public key K1 to the IoT control device. The second router is a router used by the IoT device 1 to access a local area network. It should be noted that when the second router and the first router are a same router, the IoT device 1 is in the first local area network. When the second router and the first router are two routers that interconnected, the IoT device 1 is not in the first local area network. In this case, the second router may first send the key 0 and the public key K1 to the first router, and then the first router sends the key 0 and the public key K1 to the IoT control device.

Step 504: The IoT control device generates the session key H1 based on the public key K1 and the random number L0 after receiving the ciphertext 0 and the public key K1. Then, the IoT control device decrypts the ciphertext 0 by using the session key H1, to obtain the device information of the IoT device 1. The IoT control device signs session information 1 by using a long-term private key S0 of the IoT control device, to obtain a signature 1. The IoT control device encrypts the signature 1 by using the session key 1, to obtain a ciphertext 1. The session information 1 includes the public key K0 and the public key K1. For example, the session information 1 includes (public key K0, public key K1).

An algorithm used by the IoT control device to generate the session key H1 based on the public key K1 and the random number L0 is usually the same as an algorithm used by the IoT device 1 to generate the session key H1, so that the session key H1 generated by the IoT control device based on the public key K1 and the random number L0 is the same as the session key H1 generated by the IoT device 1 based on the public key K0 and the random number L1. For example, the algorithm used by the IoT control device to generate the session key H1 based on the public key K1 and the random number L0 may be a Diffie-Hellman algorithm or another algorithm used to generate a symmetric key. This is not limited.

Step 505: The IoT control device sends the ciphertext 1 to the IoT device 1.

For example, the IoT control device sends the ciphertext 1 to the first router, and the first router sends the ciphertext 1 to the IoT device 1.

Step 506: After receiving the ciphertext 1, the IoT device 1 decrypts the ciphertext 1 by using the session key H1, to obtain the signature 1. Then, the IoT device 1 verifies the signature 1 by using a long-term public key G0 of the IoT control device, and after the signature 1 is successfully verified, signs session information 2 by using a long-term private key S1 of the IoT device 1, to obtain a signature 2. The IoT device 1 encrypts the signature 2 and session information 3 by using the session key, to obtain a ciphertext 2. The session information 2 includes the public key K1 and the public key K0. For example, the session information 2 includes (public key K1, public key K0). The session information 3 includes a session ID. For example, the session information 3 may further include a validity period of the session key 1. For example, the validity period of the session key 1 may be 12 hours, one day, seven days, or the like, and may be predefined, or may be determined by the IoT device 1 based on an algorithm or a policy. This is not limited. Further, in some other embodiments, the session information 3 may further include one or more of a session connection manner, a transmission protocol, an authentication manner, and the like. This is not limited.

Step 507: The IoT device 1 sends the ciphertext 2 to the IoT control device.

For example, the IoT device 1 sends the ciphertext 2 to the second router, and the second router sends the ciphertext 2 to the IoT control device.

Step 508: After receiving the ciphertext 2, the IoT control device decrypts the ciphertext 2 by using the session key H1, to obtain the signature 2 and the session information 3. Then, the IoT control device verifies the signature 2 by using a long-term public key G1 of the IoT device 1. After the signature 2 is successfully verified, the IoT control device stores the session information 3 and the session key H1. Therefore, encrypted communication between the IoT control device and the IoT device 1 can be implemented subsequently based on the session key H1. The long-term public key G1 of the IoT device 1 is found by the IoT control device based on the device information (for example, a device ID of the IoT device 1) of the IoT device 1.

In this embodiment of this application, IoT devices in the first local area network obtain a same public key from the discovery message, but there is a relatively low probability that different IoT devices use a same random number when generating session keys. Therefore, session keys of different IoT devices are also different. Therefore, communication security is not reduced when session keys obtained by using the key negotiation method in this embodiment of this application are used for encrypted communication.

Figure 6:
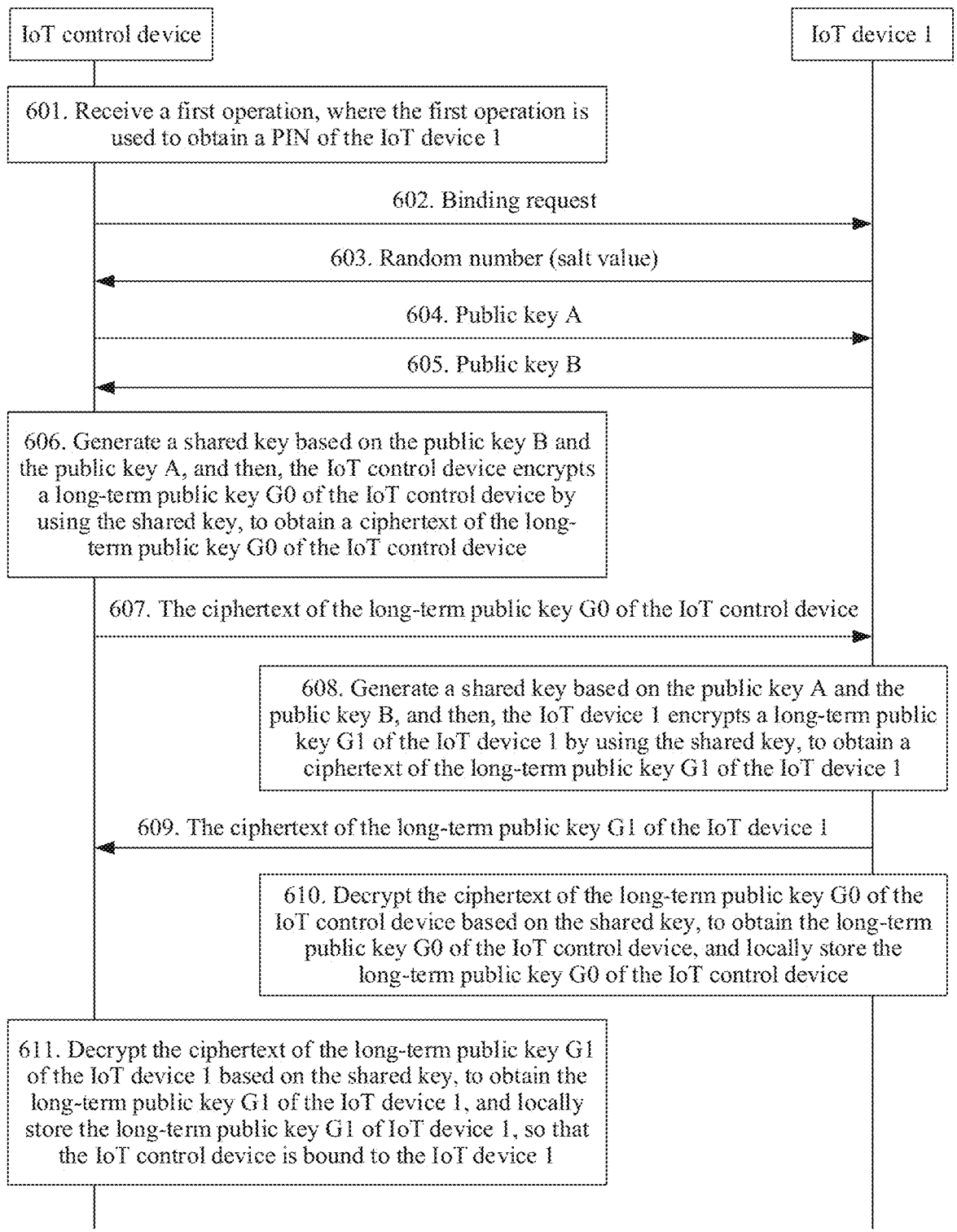
FIG. 6 is a schematic diagram of an IoT device binding procedure according to an embodiment of this application.
Figure 7A:
FIG. 7A to FIG. 7E are a schematic diagram of a user interface according to an embodiment of this application.
Figure 7B:
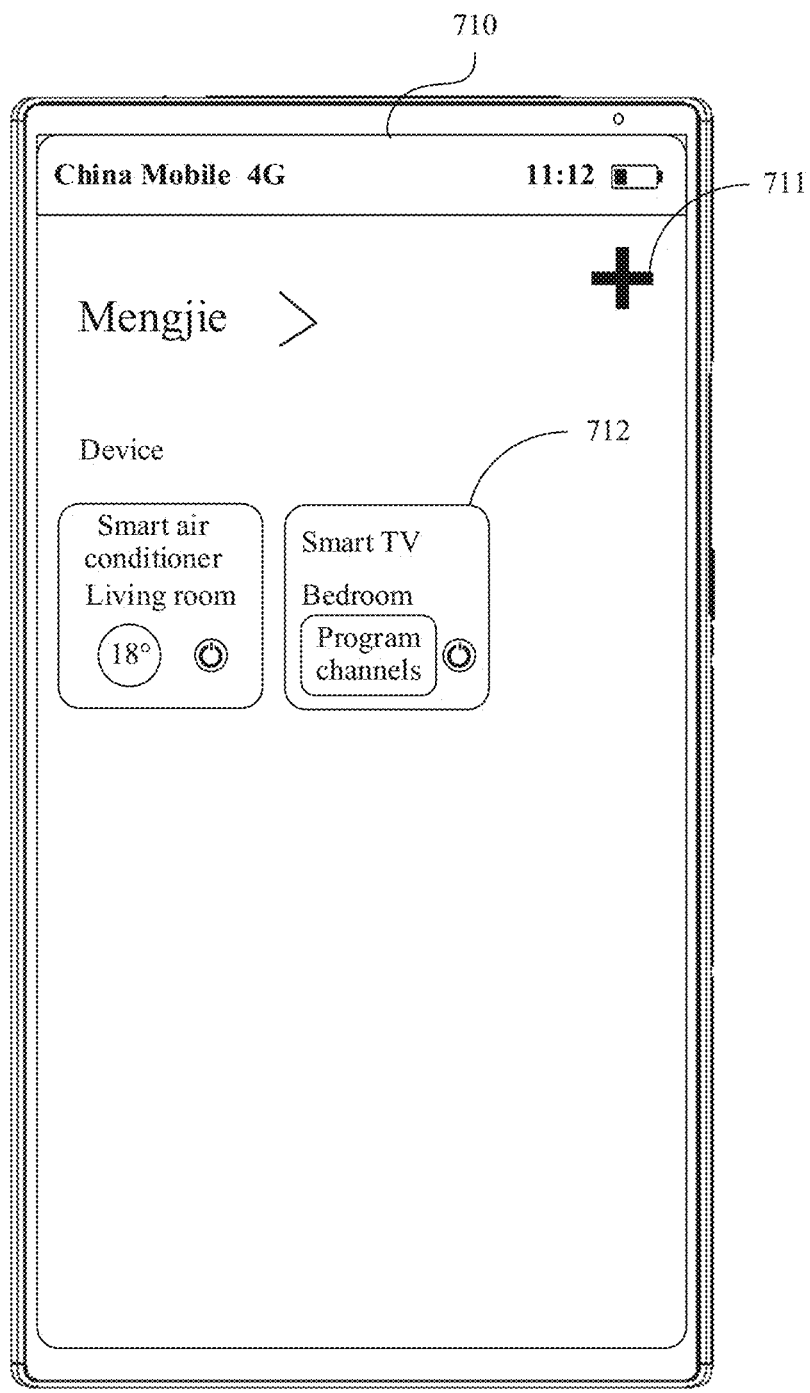
Figure 7C:
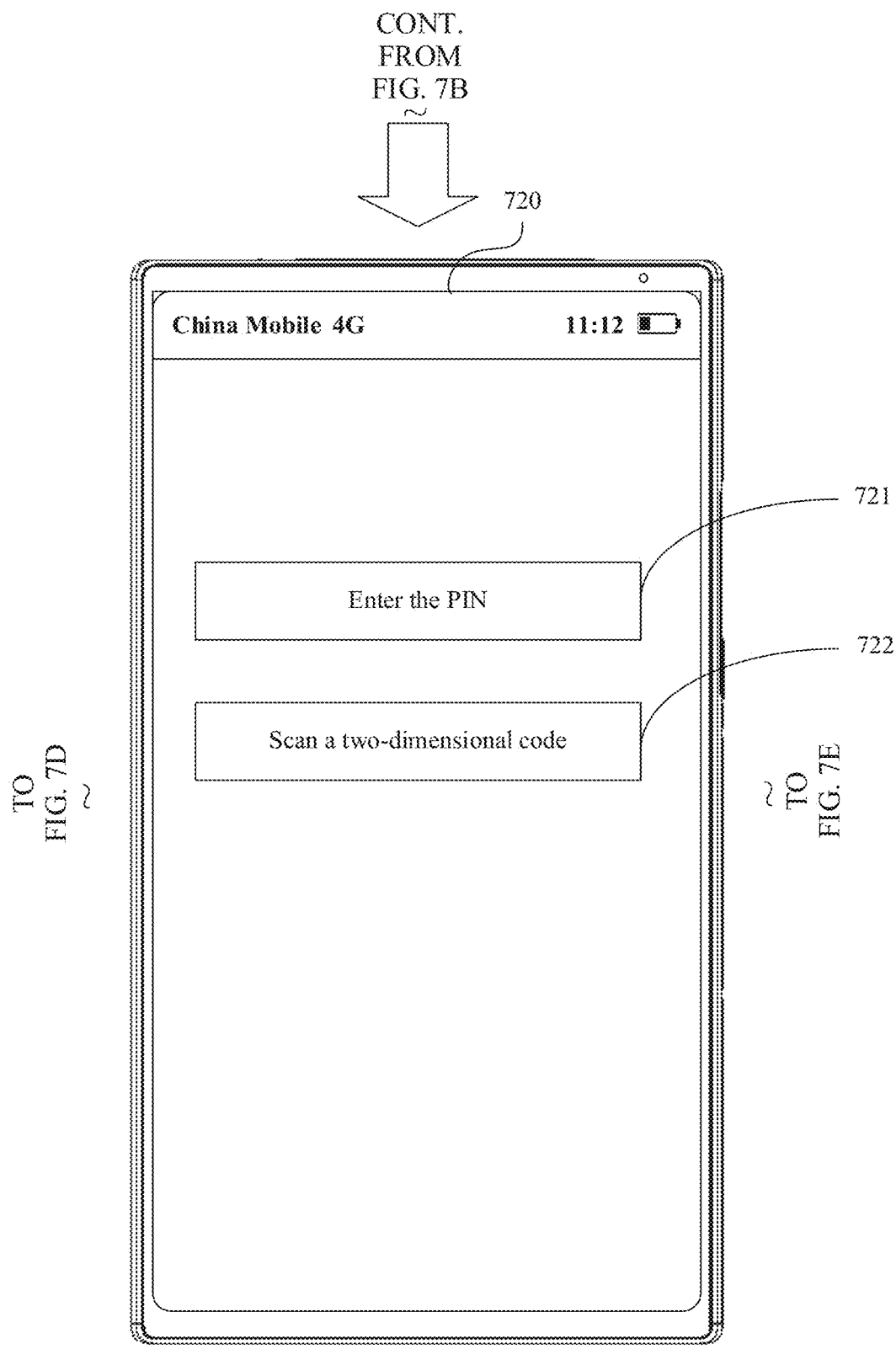
Figure 7D:
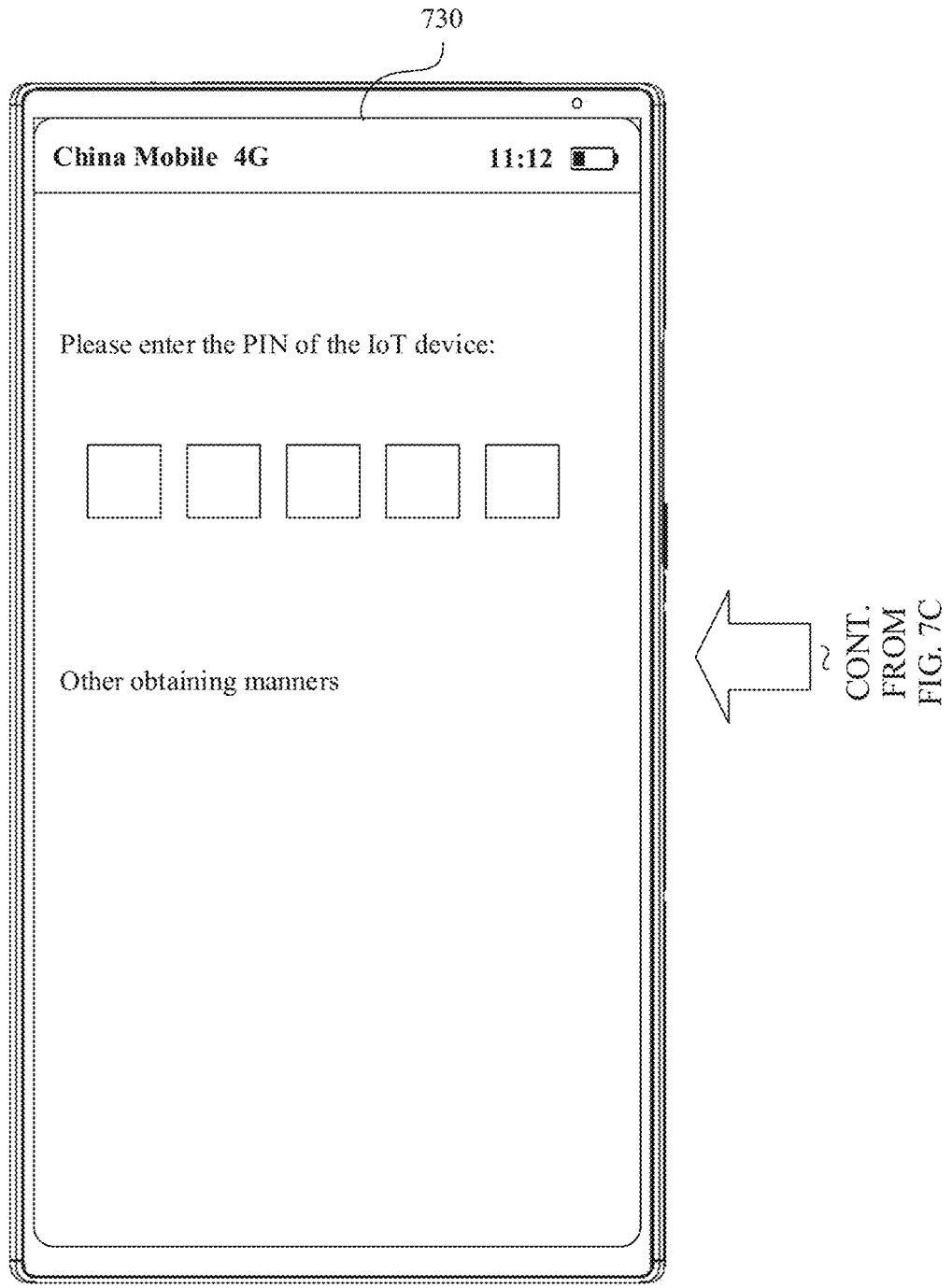
Figure 7E:
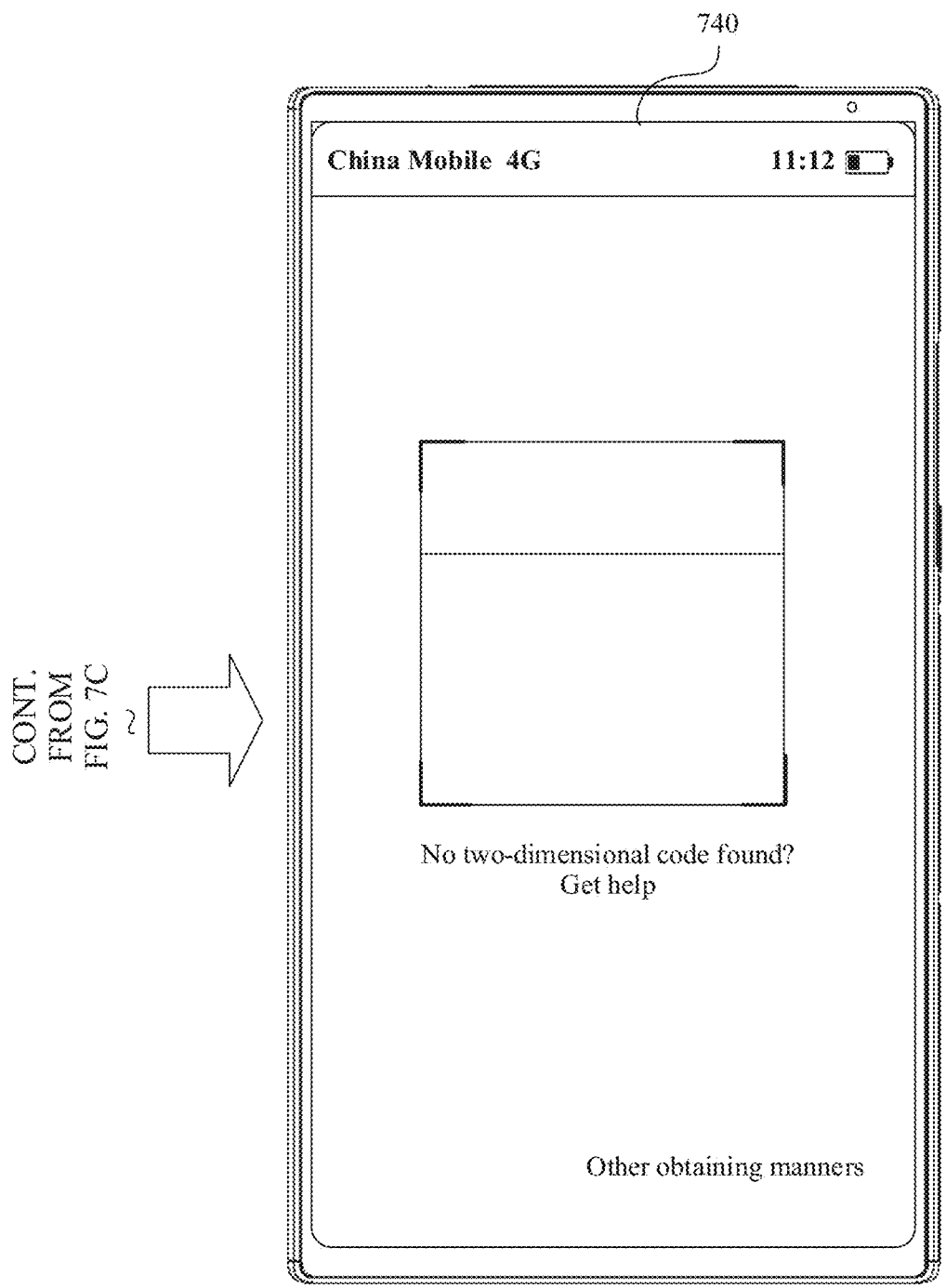

An IoT device 1 is used as an example to describe a procedure of binding an IoT device and an IoT control device. For example, as shown in FIG. 6, the following steps are specifically included.

Step 601: An IoT control device receives a first operation. The first operation is used to enter a personal identification number (personal identification number, PIN) of the IoT device 1.

Step 602: In response to an end of the first operation, the IoT control device obtains the PIN of the IoT device 1, and sends a device binding request to the IoT device 1.

Figure 8:
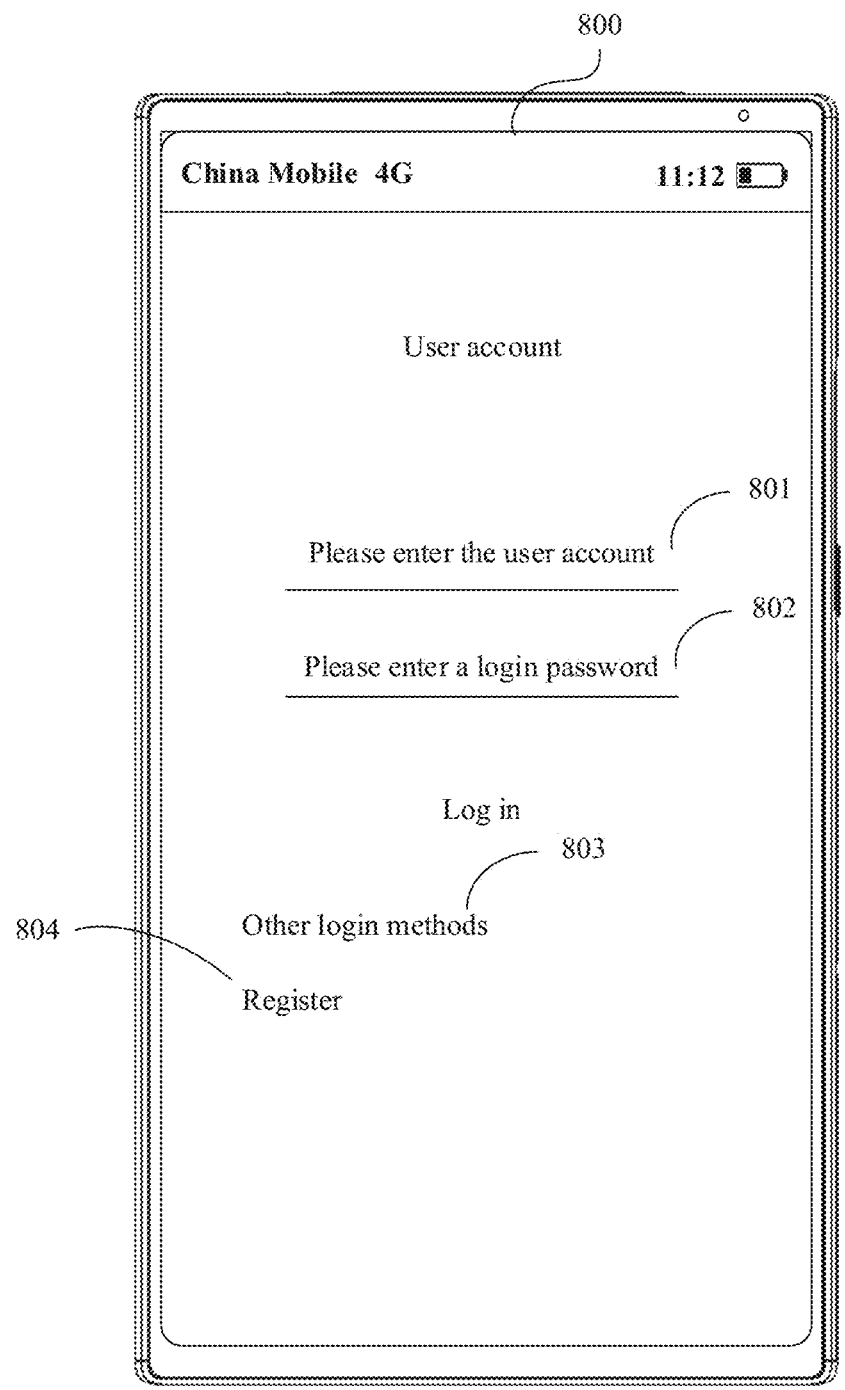
FIG. 8 is a schematic diagram of another user interface according to an embodiment of this application.

For example, the first operation may be an operation of entering the PIN of the IoT device 1 by a user, an operation of scanning a two-dimensional code of the IoT device 1 by a user, or the like. For example, the IoT control device displays a home screen on a display screen, and the home screen includes an icon of an IoT application. For example, the main screen is a screen 700 shown in FIG. 7A to FIG. 7E. The IoT control device may display a screen of the IoT application on the display screen in response to an operation of tapping an icon 701 of the IoT application by the user. For example, the screen of the IoT application is a screen 710 shown in FIG. 7A to FIG. 7E. The screen 710 includes a control 711 for adding an IoT device. The IoT control device may display a screen 720 in response to tapping of the control 711 of the IoT device by the user. The screen 720 includes a control 721 and a control 722. Further, when a user account of the IoT application is in a logged-in state, the IoT control device displays the screen 720 in response to tapping of the control 711 of the IoT device the user. For example, when the user account of the IoT application is in a non-logged-in state, the IoT control device prompts the user to register or log in to the user account. For example, the IoT control device displays a login screen in response to tapping of the control 711 of the IoT device by the user. For example, the login screen is shown in FIG. 8, and includes a user account input box 801, a login password input box 802, a control 803 for another login mode, a registration control 804, and the like. The user may enter the user account in the user account input box 801, and enter a login password in the login password input box, so that the user account of the IoT application is in the login state. The user account may be a mobile number, an email address, a nickname, or the like, and is a user ID.

The IoT device displays a screen 730 on the display screen in response to tapping of the control 721 by the user. The screen 730 includes a PIN input box. The user may enter a PIN of the IoT device in the PIN input box. The IoT control device may obtain the PIN of the IoT device 1 from the PIN input box. Alternatively, the IoT device displays a screen 740 on the display screen in response to tapping of the control 722 by the user. The screen 740 includes a scan box. The user may scan the two-dimensional code of the IoT device 1 in the scanning box, to obtain the PIN of the IoT device 1.

In some other embodiments, the IoT control device may alternatively display the screen 730 or the screen 740 in response to tapping of the control 711 of the IoT device by the user.

It should be noted that in this embodiment of this application, a PIN input screen or a two-dimensional code scanning screen of the IoT device 1 may be displayed by using another operation, for example, a voice instruction or a shortcut gesture operation.

Step 603: After receiving the device binding request, the IoT device 1 sends a random number (salt, which may also be referred to as a salt value) to the IoT control device.

Step 604: The IoT control device receives the random number (salt), and sends a public key A to the IoT device 1, where the public key A and a private key A are a key pair, and are generated by the IoT control device based on the random number (salt) and the PIN of the IoT device 1.

For example, the IoT control device generates the public key A and the private key A based on the random number (salt), the PIN of the IoT device 1, and a password authenticated key negotiation (PAKE) protocol.

Step 605: The IoT device 1 sends a public key B to the IoT control device. The public key B and the private key B are another key pair, and are generated by the IoT device 1 based on the random number (salt) and the PIN of the IoT device 1.

Step 606: After receiving the public key B, the IoT control device generates a shared key based on the public key B and the private key A. Then, the IoT control device encrypts a long-term public key G0 of the IoT control device by using the shared key, to obtain a ciphertext of the long-term public key G0 of the IoT control device.

Step 607: The IoT control device sends the ciphertext of the long-term public key G0 of the IoT control device to the IoT device 1.

Step 608: After receiving the public key A, the IoT device 1 generates a shared key based on the public key A and the private key B. Then, the IoT device 1 encrypts a long-term public key G1 of the IoT device 1 by using the shared key, to obtain a ciphertext of the long-term public key G1 of the IoT device 1.

Step 609: The IoT device 1 sends the ciphertext of the long-term public key G1 of the IoT device 1 to the IoT control device.

Step 610: After receiving the ciphertext of the long-term public key G0 of the IoT control device, the IoT device 1 decrypts the ciphertext of the long-term public key G0 of the IoT control device based on the shared key, to obtain the long-term public key G0 of the IoT control device, and locally stores the long-term public key G0 of the IoT control device.

Step 611: After receiving the ciphertext of the long-term public key G1 of the IoT device 1, the IoT control device decrypts the ciphertext of the long-term public key G1 of the IoT device 1 based on the shared key, to obtain the long-term public key G1 of the IoT device 1, and locally stores the long-term public key G1 of IoT device 1. In this way, the IoT control device is bound to the IoT device 1.

It should be noted that there is no necessary sequence between step 603 and step 605, and between step 604 and step 605, but step 603 is prior to step 604.

Figure 9:
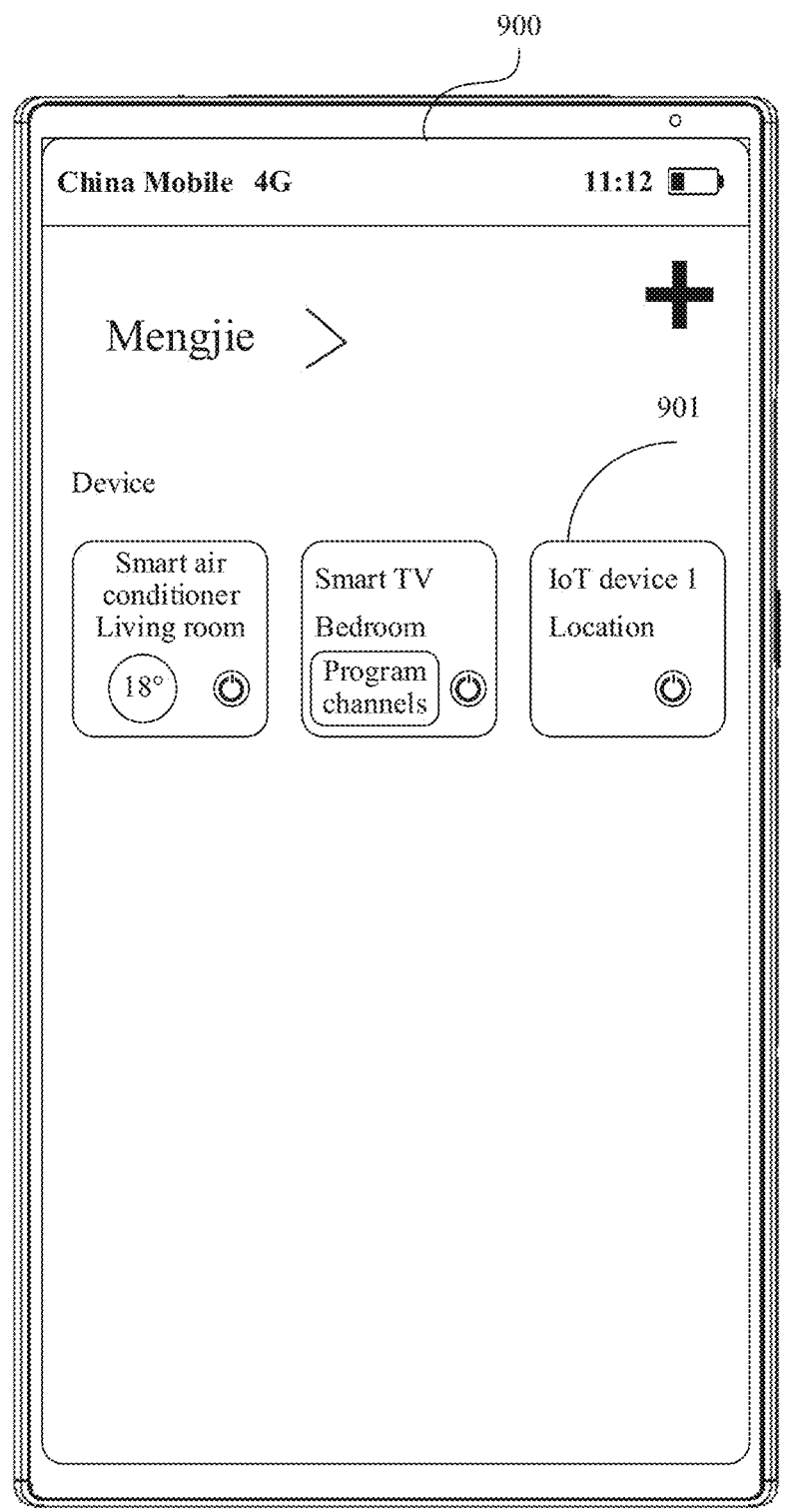
FIG. 9 is a schematic diagram of another user interface according to an embodiment of this application.

In some embodiments, after the IoT control device is bound to the IoT device 1, a widget of the IoT device 1 may be added to the screen of the IoT application. For example, the screen of the IoT application is a screen 900 shown in FIG. 9, and includes a widget 901 of the IoT device 1. The user may enable or disable a device by performing an operation on a control on the widget 900 of the IoT device 1. Further, the user may further display, on the display screen by operating the widget 901 of the IoT device, a detailed screen including the control of the IoT device 1. The user may perform an operation on a related control on the screen, so that the IoT control device sends a control instruction to the IoT device 1, to control the IoT device.

In addition, it should be noted that, for each of the IoT control device and the IoT device 1, the long-term public key and the long-term private key may be preconfigured in the device before the device is delivered.

In addition, in a scenario in which session information (for example, a session ID) in an IoT device is not lost and a session key is still in a validity period, an embodiment of this application further provides a key negotiation method, to help reduce key negotiation steps between the IoT device and an IoT control device, and improve key negotiation efficiency.

Figure 10:
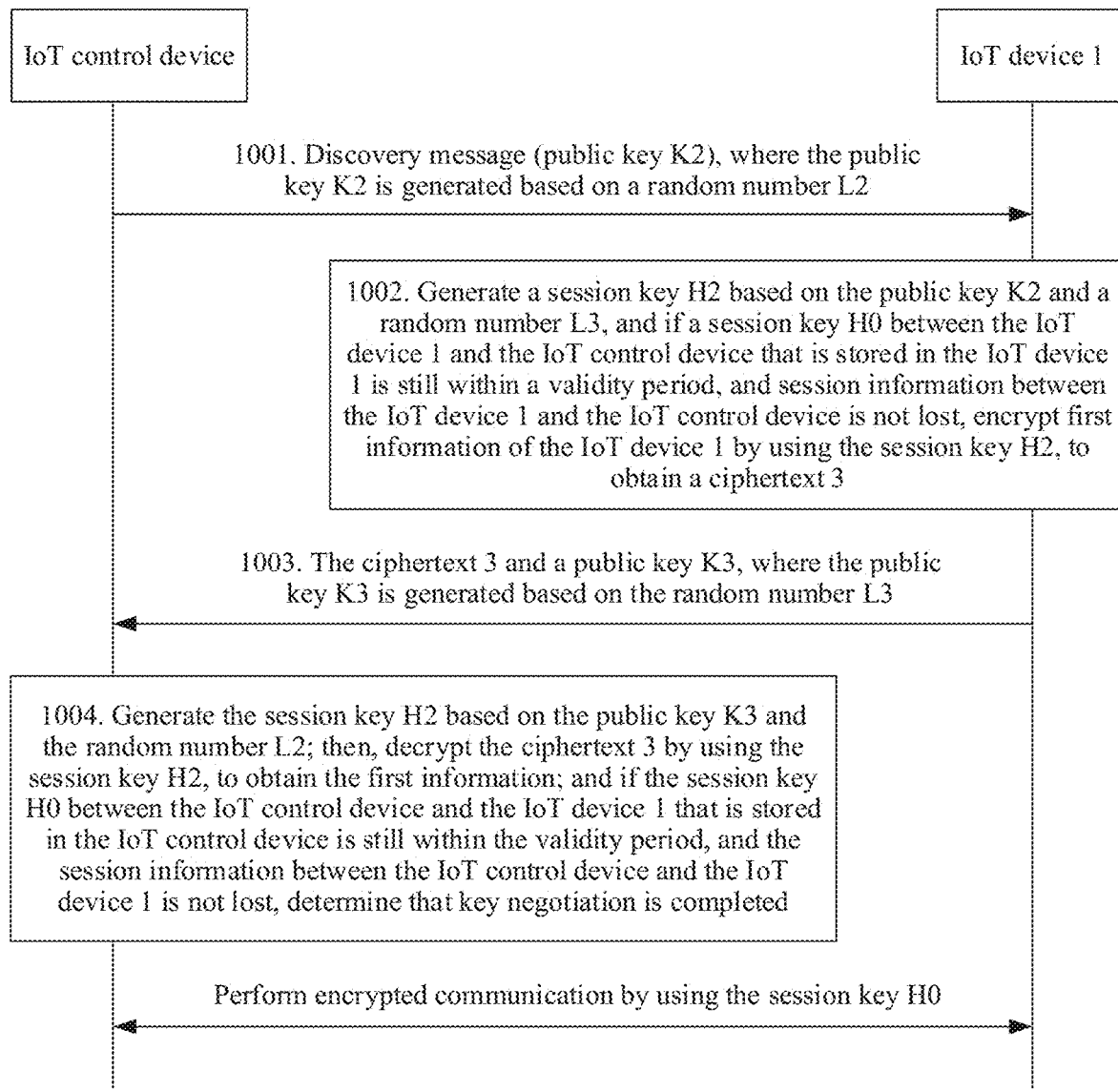
FIG. 10 is a schematic flowchart of another key negotiation method according to an embodiment of this application.

For example, FIG. 10 shows another key negotiation method according to an embodiment of this application. The method specifically includes the following steps.

Step 1001: An IoT control device multicasts a discovery message in a first local area network. The discovery message includes a public key K2. The public key K2 is generated based on a random number L2. The first local area network is a network that has been accessed by the IoT control device.

For step 1001, refer to related descriptions of step 501. Details are not described herein again.

Step 1002: An IoT device 1 generates a session key H2 based on the public key K2 and a random number L3 after receiving the discovery message; and if a session key H0 between the IoT device 1 and the IoT control device that is stored in the IoT device 1 is still in a validity period, and session information between the IoT device 1 and the IoT control device is not lost, encrypts first information of the IoT device 1 by using the session key H2, to obtain a ciphertext 3.

The first information includes device information of the IoT device 1. In addition, the first information may further include session information between the IoT device 1 and the IoT control device or other related information that is stored in the IoT device 1. For example, the session information included in the first information may be information such as a session ID.

Specifically, for related descriptions of the device information of the IoT device 1, generation of the session key H2, and the like, refer to related descriptions in the foregoing embodiments. Details are not described herein again.

In some embodiments, if a session key H1 between the IoT device 1 and the IoT device that is stored in the IoT device 1 is not within the validity period or the session information is lost, the IoT device 1 encrypts the device information of the IoT device 1 by using the session key H2, to obtain a ciphertext 0, and then performs step 503 and subsequent steps.

For example, the IoT device 1 may determine whether the session information between the IoT device 1 and the IoT control device is lost by determining whether a quantity of sessions between the IoT device 1 and the IoT control device is greater than or equal to a maximum value limited by a system. For example, if the quantity of sessions between the IoT device 1 and the IoT control device is greater than or equal to the maximum value limited by the system, the IoT device 1 determines that the session information between the IoT device 1 and the IoT control device is lost. For another example, if the quantity of sessions between the IoT device 1 and the IoT control device is less than the maximum value limited by the system, the IoT device 1 determines that the session information between the IoT device 1 and the IoT control device is not lost.

Step 1003: The IoT device 1 sends the ciphertext 3 and a public key K3 to the IoT control device. The public key K3 is generated based on the random number L3.

Step 1004: The IoT control device generates a session key H2 based on the public key K3 and the random number L2 after receiving the ciphertext 3 and the public key K3. Then, the IoT control device decrypts the ciphertext 3 by using the session key H2, to obtain the first information. If a session key H0 between the IoT control device and the IoT device 1 that is stored in the IoT control device is still within a validity period, and session information between the IoT control device and the IoT device 1 is not lost, it is determined that key negotiation is completed.

Subsequently, encrypted communication between the IoT control device and the IoT device 1 is implemented based on the session key H0.

In some embodiments, if the session information between the IoT control device and the IoT device 1 is lost, the IoT control device signs session information A by using a long-term private key S0 of the IoT control device, to obtain a signature A. The session information A includes the public key K2 and the public key K3. For example, the session information A includes (the public key K2 and the public key K3). Then, the IoT control device encrypts the signature A by using the session key H2, to obtain a ciphertext A. and sends the ciphertext A to the IoT device 1. After receiving the ciphertext A, the IoT device 1 decrypts the ciphertext A by using the session key H2, to obtain the signature A. and then, verifies the signature A by using a long-term public key G0 of the IoT control device. After successfully verifying the signature A, the IoT device 1 signs session information B by using a long-term private key S1 of the IoT 1 device, to obtain a signature B. The session information B includes the public key K3 and the public key K2. For example, the session information B includes (public key K3, public key K2). The IoT device 1 encrypts a signature B2 and session information C by using the session key H2, to obtain a ciphertext B. For the session information C, refer to related descriptions of the session information 3. The IoT device 1 sends the ciphertext B to the IoT control device. After receiving the ciphertext B, the IoT control device decrypts the ciphertext B by using the session key H2, to obtain the signature B and the session information C. The IoT control device verifies the signature B by using a long-term public key G1 of the IoT device 1, and stores the session key H2 and the session information C after successfully verifying the signature B. Therefore, encrypted communication between the IoT control device and the IoT device 1 can be implemented subsequently based on the session key H2.

The foregoing embodiments may be used separately, or may be used in combination with each other. This is not limited.

In the foregoing embodiments provided in this application, the methods provided in the embodiments of this application are described from a perspective that an electronic device is used as an execution body. To implement functions in the method provided in the foregoing embodiments of this application, the electronic device may include a hardware structure and/or a software module, and implement the foregoing functions in a form of a hardware structure, a software module, or a hardware structure plus a software module. Whether a function in the foregoing functions is performed in a form of a hardware structure, a software module, or a hardware structure plus a software module depends on a specific application and design constraint condition of the technical solution.

Figure 11:
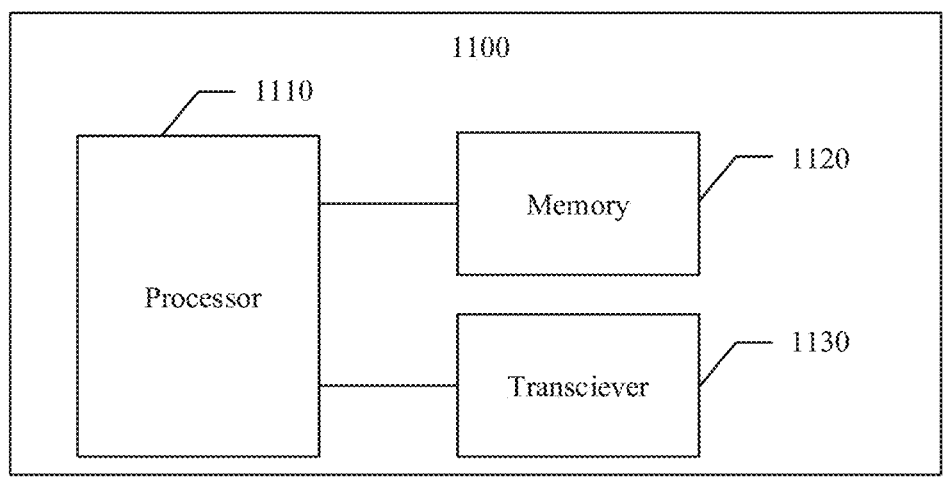
FIG. 11 is a schematic structural diagram of an electronic device according to an embodiment of this application.

Based on a same concept, FIG. 11 shows an electronic device 1100 according to this application. For example, the electronic device 1100 includes at least one processor 1110 and a memory 1120. The processor 1110 is coupled to the memory 1120. The coupling in this embodiment of this application is an indirect coupling or a communication connection between apparatuses, units, or modules, may be in an electrical form, a mechanical form, or another form, and is used for information exchanges between the apparatuses, the units, or the modules.

Specifically, the memory 1120 is configured to store program instructions. When the processor 1110 is configured to read the program instructions stored in the memory 1120, the electronic device 1100 is enabled to perform the key negotiation method in the embodiments of this application. For example, when the processor 1110 invokes the program instructions stored in the memory 1120, the electronic device 1100 is enabled to perform the steps performed by the IoT control device or the IoT device 1 in the key negotiation method shown in FIG. 5 or FIG. 10.

In some embodiments, the electronic device 1100 further includes a transceiver 1130. For example, when the electronic device 1100 performs the steps performed by the IoT control device in the method shown in FIG. 5 or FIG. 10, the transceiver 1130 may be configured to multicast a discovery message, receive a discovery response from the IoT device, and the like. For another example, when the electronic device 1100 performs the steps performed by the IoT device 1 in the method shown in FIG. 5 or FIG. 10, the transceiver 1130 may be configured to receive a discovery message, send a discovery response to the IoT control device, and the like.

It should be understood that the electronic device 1100 may be configured to implement the key negotiation method in the embodiments of this application. For a related feature, refer to the foregoing description. Details are not described herein again.

Figure 12:
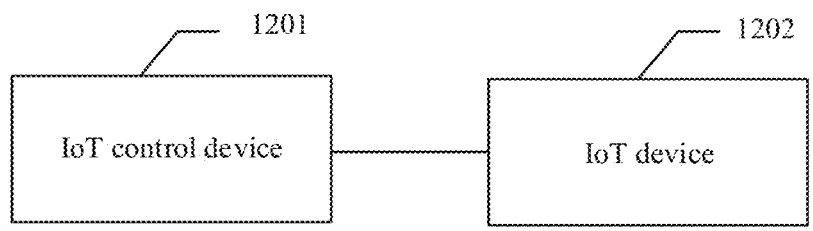
FIG. 12 is a schematic diagram of a communications system according to an embodiment of this application.

In addition, an embodiment of this application further provides a communications system. As shown in FIG. 12, the communications system includes an IoT control device 1201 and one or more IoT devices 1202. The IoT control device 1201 is configured to perform the steps performed by the IoT control device in the key negotiation method in the embodiments of this application. For example, the IoT control device 1201 performs the steps performed by the IoT control device in the key negotiation method shown in FIG. 5 or FIG. 10. The IoT device 1202 is configured to indicate the steps performed by the IoT device 1 in the key negotiation method in the embodiments of this application. For example, the IoT device 1202 performs the steps performed by the IoT device 1 in the key negotiation method shown in FIG. 5 or FIG. 10. For a specific implementation, refer to related descriptions in the method part. Details are not described herein again.

A person skilled in the art may clearly understand that the embodiments of this application may be implemented by hardware, firmware or a combination thereof. When the embodiments of this application are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. Examples of the computer-readable medium include but are not limited to: a RAM, a ROM, an electrically erasable programmable read-only memory (electrically erasable programmable read-only memory, EEPROM), a compact disc read-only memory (compact disc read-only memory, CD-ROM) or other optical disc storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used in the embodiments of this application includes a compact disc (compact disc, CD), a laser disc, an optical disc, a digital video disc (digital video disc, DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, or improvement made without departing from the spirit and principle of this application shall fall within the protection scope of this application.

What is claimed is:

1. A method implemented by an Internet of Things (IoT) control device, wherein the method comprises:
   obtaining a first public key based on a first random number;
   accessing a first local area network;
   multicasting, in the first local area network, a discovery message comprising the first public key, wherein the first local area network is accessed by the IoT control device;
   receiving, from a first IoT device, a discovery response comprising a first ciphertext and a second public key, wherein the first ciphertext is based on device information of the first IoT device and a first session key, wherein the second public key is based on a second random number, and wherein the first session key is based on the first random number and the second public key;
   obtaining a second ciphertext by encrypting a first signature based on the first session key, wherein the first signature is on a first session information based on a first long-term private key of the IoT control device, wherein the first session information comprises the first public key and the second public key;
   sending, to the first IoT device, the second ciphertext;
   receiving, from the first IoT device, a third ciphertext that is based on a second signature, a second session information, and the first session key, wherein the second signature is on a third session information based on a second long-term private key of the first IoT device, wherein the third session information comprises the second public key and the first public key, and wherein the second session information comprises a session identifier (ID);
   decrypting, based on the first session key, the third ciphertext to obtain the second signature and the second session information;
   verifying, based on a long-term public key of the first IoT device, the second signature;
   saving the first session key and the second session information after the second signature is verified; and
   performing, based on the first session key, first encrypted communication with the first IoT device.

2. The method of claim 1, wherein the second session information further comprises a validity period of the first session key.

3. The method of claim 1, wherein after multicasting the discovery message, the method further comprises:
   receiving, from the first IoT device, a fourth ciphertext that is based on a first information and the first session key, wherein the first information comprises the device information; and
   performing, based on a second session key between the IoT control device and the first IoT device, second encrypted communication with the first IoT device when the IoT control device determines that the second session key is within a validity period or that stored session information between the IoT control device and the first IT device is not lost.

4. The method of claim 3, wherein the first information further comprises a fourth session information comprising a stored ID of a session between the first IoT device and the first IoT device.

5. The method of claim 1, further comprising periodically multicasting, in the first local area network, the discovery message.

6. The method of claim 1, wherein the first IoT device is in a second local area network.

7. A method implemented by an Internet of Things (IoT) device, wherein the method comprises:
   receiving, multicast from an IoT control device in a first local area network, a discovery message comprising a first public key, wherein the first local area network has been accessed by the IoT control device, and wherein the first public key is based on a first random number;
   obtaining a first session key based on the first public key and a second random number;
   obtaining a first ciphertext by encrypting device information of the IoT device based on the first session key;

obtaining a second public key based on the second random number;

sending, to the IoT control device, a discovery response comprising the first ciphertext and the second public key;

receiving, from the IoT control device, a second ciphertext that is based on a first signature and the first session key, wherein the first signature is on a first session information based on a first long-term private key of the IoT control device, and wherein the first session information comprises the first public key and the second public key;

decrypting, based on the first session key, the second ciphertext to obtain the first signature;

verifying, based on a long-valid public key of the IoT control device, the first signature;

obtaining a third ciphertext by encrypting a second signature and a second session information based on the first session key, wherein the second signature is on a third session information based on a second long-term private key of the IoT device, wherein the third session information comprises the second public key and the first public key, and wherein the second session information comprises a session identifier (ID); and sending, to the IoT control device after verifying the first signature, the third ciphertext.

8. The method of claim 7, wherein the second session information further comprises a validity period of the first session key.

9. The method of claim 7, wherein after receiving the discovery message and before sending the discovery response, the method further comprises determining that a stored second session key between the IoT device and the IoT control device is not within a validity period or a fourth session information between the IoT device and the IoT control device is not stored.

10. The method of claim 9, wherein after receiving the discovery message, the method further comprises:

obtaining a fourth ciphertext by encrypting a first information based on the first session key, wherein the first information comprises the device information; and sending, to the IoT control device when the IoT device determines that the stored second session key is within the validity period or the fourth session information is not lost, the fourth ciphertext.

11. The method of claim 10, wherein the first information further comprises the fourth session information.

12. The method of claim 7, further comprising:

periodically receiving, multicast from the IoT control device in the first local area network, the discovery message;

receiving, during network switching and multicast from the IoT control device in the first local area network, the discovery message receiving, after being bound to the IoT control device and multicast from the IoT control device in the first local area network, the discovery message; or receiving, when a stored second session key between the IoT device and the IoT control device reaches an expiration date of a validity period and multicast from the IoT control device in the first local area network, the discovery message.

13. The method of claim 7, wherein the IoT device is in a second local area network.

14. An Internet of Things (IoT) control device comprising:

a memory configured to store instructions; and a processor coupled to the memory, wherein the instructions cause the processor to be configured to:

obtain a first public key based on a first random number;

access a first local area network;

multicast, in the first local area network, a discovery message comprising the first public key;

receive, from a first IoT device, a discovery response comprising a first ciphertext and a second public key, wherein the first ciphertext is based on device information of the first IoT device and a first session key, wherein the second public key is based on a second random number, and wherein the first session key is based on the first random number and the second public key;

obtain a second ciphertext by encrypting a first signature based on the first session key, wherein the first signature is on a first session information based on a first long-term private key of the IoT control device, wherein the first session information comprises the first public key and the second public key;

send, to the first IoT device, the second ciphertext;

receive, from the first IoT device, a third ciphertext that is based on a second signature, a second session information, and the first session key, wherein the second signature is on a third session information based on a second long-term private key of the first IoT device, wherein the third session information comprises the second public key and the first public key, and wherein the second session information comprises a session identifier (ID);

decrypt, based on the first session key, the third ciphertext to obtain the second signature and the second session information;

verify, based on a long-term public key of the first IoT device, the second signature;

save the first session key and the second session information after the second signature is verified; and perform, based on the first session key, first encrypted communication with the first IoT device.

15. The IoT control device of claim 14, wherein the second session information further comprises a validity period of the first session key.

16. The IoT control device of claim 14, wherein after multicasting the discovery message, the instructions further cause the processor to be configured to:

receive, from the first IoT device, a fourth ciphertext that is based on a first information and the first session key, wherein the first information comprises the device information; and perform, based on a second session key between the IoT control device and the first IoT device, second encrypted communication with the first IoT device when the IoT control device determines that the second session key is within a validity period or that stored session information between the IoT control device and the first IoT device is not lost.

17. The IoT control device of claim 16, wherein the first information further comprises a fourth session information comprising a stored ID of a session between the first IoT device and the first IoT device.

18. The IoT control device of claim 14, wherein the instructions further cause the processor to be configured to:

periodically multicast, in the first local area network, the discovery message;

multicast, in the first local area network, the discovery message when the IoT control device switches from a second local area network to the first local area network;

multicast, in the first local area network, the discovery message when the IoT control device is bound to a new IoT device; or multicast, in the first local area network, the discovery message when a session key of a second IoT device reaches an expiration date of a validity period.

19. The IoT control device of claim 14, wherein the first IoT device is in a second local area network.

20. The method of claim 1, further comprising:

multicasting, in the first local area network, the discovery message when the IoT control device switches from a second local area network to the first local area network;

multicasting, in the first local area network, the discovery message when the IoT control device is bound to a new IoT device; and multicasting, in the first local area network, the discovery message when a session key of a second IoT device reaches an expiration date of a validity period.

\* \* \* \* \*

UNITED STATES PATENT AND TRADEMARK OFFICE
CERTIFICATE OF CORRECTION

PATENT NO. : 12,155,755 B2
APPLICATION NO. : 17/780902
DATED : November 26, 2024
INVENTOR(S) : Lu Gan et al.

Page 1 of 1

It is certified that error appears in the above-identified patent and that said Letters Patent is hereby corrected as shown below:

In the Claims

Claim 3, Column 20, Line 47: "the first IT device" should read "the first IoT device"

Signed and Sealed this
Thirty-first Day of December, 2024

Derrick Brent
*Acting Director of the United States Patent and Trademark Office*